(12) United States Patent
Kasturia

(10) Patent No.: US 6,388,998 B1
(45) Date of Patent: May 14, 2002

(54) REUSE OF CODES AND SPECTRUM IN A CDMA SYSTEM WITH MULTIPLE-SECTOR CELLS

(75) Inventor: Sanjay Kasturia, Palo Alto, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/244,645

(22) Filed: Feb. 4, 1999

(51) Int. Cl.⁷ .............................. H04B 7/216; H04Q 7/20
(52) U.S. Cl. ................... 370/320; 370/335; 455/63; 455/437; 455/439; 455/450; 455/562
(58) Field of Search ........................... 370/320–332, 370/335, 342, 441, 492, 252; 455/63, 255, 256, 257, 258, 259, 264, 265, 180.03, 279.1, 442, 443, 437, 439, 506; 375/130, 267, 335, 151

(56) References Cited

U.S. PATENT DOCUMENTS

| 5,276,907 A | * | 1/1994 | Meidan ....................... 455/436 |
| 5,428,818 A | * | 6/1995 | Meidan et al. ............... 455/450 |
| 5,533,011 A | * | 7/1996 | Dean et al. .................. 370/342 |
| 6,028,850 A | * | 2/2000 | Kand ........................... 370/320 |

FOREIGN PATENT DOCUMENTS

WO    WO 98/59512    * 12/1998

* cited by examiner

Primary Examiner—Alpus H. Hsu
Assistant Examiner—Afsar M. Qureshi
(74) Attorney, Agent, or Firm—Wilford L. Wisner

(57) ABSTRACT

A system and a method for code division multiple access (CDMA) communication. The system includes fixed terminals communicating with a central base station. The terminals in protection sectors of each sector are configured to employ codes from different sets of codes to overcome potential mutual interference between sectors on account of antenna radiation pattern roll-off. The remaining codes, preferably the majority of the available codes, are used in any one of a plurality of basic sectors, each of which separates the protection sectors of a respective sector. For an even number of sectors in a cell, the available codes are partitioned into three groups, two for the protection sectors and one for the basic sectors. For an odd number of sectors in a cell, the available codes are partitioned into four groups, three for the protection sectors and one for the basic sectors. Protection sectors are relatively narrow but broad enough to counteract the potential mutual interference between sectors.

12 Claims, 1 Drawing Sheet

REUSE OF CODES AND SPECTRUM IN A CDMA SYSTEM WITH MULTIPLE-SECTOR CELLS

BACKGROUND OF THE INVENTION

1. Field of the Invention

This invention relates to code division multiple access communication systems and to methods for operating them, particularly to such systems and methods in a fixed wireless loop environment.

2. Discussion of the Related Art

Code Division Multiple Access (CDMA) has become one of the major technologies for digital wireless communication in the U.S. and worldwide. Growing demand for the service provided by fixed wireless loop systems based on CDMA exists particularly in those countries and areas that are insufficiently supplied with basic telephone infrastructure. In particular, the demand has grown for telephone connections of sufficient bandwidth and quality for convenient access to the Internet.

In systems addressing this need, the users are static and their locations are known. In this environment, digital wireless communication is provided in a fixed arrangement of cells containing fixed terminals. As an example for such a fixed wireless loop CDMA system, the code-limited capacity may be 128 channels, minus those used for pilot and control channels. For implementation, several options exist. First, the base station of each cell could use an omnidirectional antenna. Second, the cell can be divided into a number of sectors with a base station antenna for each sector. Codes can be reused in non-interfering sectors, but the inevitable overlap of the antenna patterns leads to a further requirement to avoid mutual interference between adjacent sectors. Thus, the third and fourth options pertain to multiple-sector cells and involve, respectively, using different portions of available bandwidth in adjacent sectors subject to mutual interference, or using different ones of the available codes in adjacent sectors subject to mutual interference. Further growth in demand currently can be met only by increasing the number of cells and the number of relatively expensive base stations. It is desirable to have a better way to meet increases in demand in such a CDMA system.

SUMMARY OF INVENTION

According to the invention, in a fixed wireless loop CDMA system having multiple sectors, there are established two protection sectors at both edges of each sector, The purpose of the protection sectors is to prevent mutual interference between adjacent sectors resulting from the roll-off of the radiation patterns of the sector antennas. The remaining part of a sector separates the protection sectors and will be called a basic sector. The spreading codes are divided among all sectors so that two neighboring sectors, no matter whether a protection sector next to a protection sector, or a protection sector next to a basic sector, do not have any codes in common. The two protection sectors on opposite edges of the same sector use codes from the same group of codes. In cells with an even number of sectors, three groups of codes are sufficient, one group for the basic sectors and two groups for the protection sectors. Cells with an odd number of sectors need four groups of codes, one for the basic sectors and three for the protection sectors.

Advantageously, all of the codes not used in the protection sectors are used in any one of the basic sectors.

Specifically, in a system according to a first aspect of the invention, each of the terminals in a protection sector or a basic sector is configured to use an assigned specific code from an appropriate one of the groups of codes.

Further specifically, in a method according to a second aspect of the invention, codes from appropriate ones of the groups of codes are assigned to terminals in protection sectors and basic sectors Protection sectors are relatively narrow but broad enough to counteract the potential mutual interference between sectors.

BRIEF DESCRIPTION OF THE DRAWING

Further features and advantages according to both aspects of the invention will become apparent from the following detailed description, taken together with the drawing, in which.

DETAILED DESCRIPTION

Figure 1:
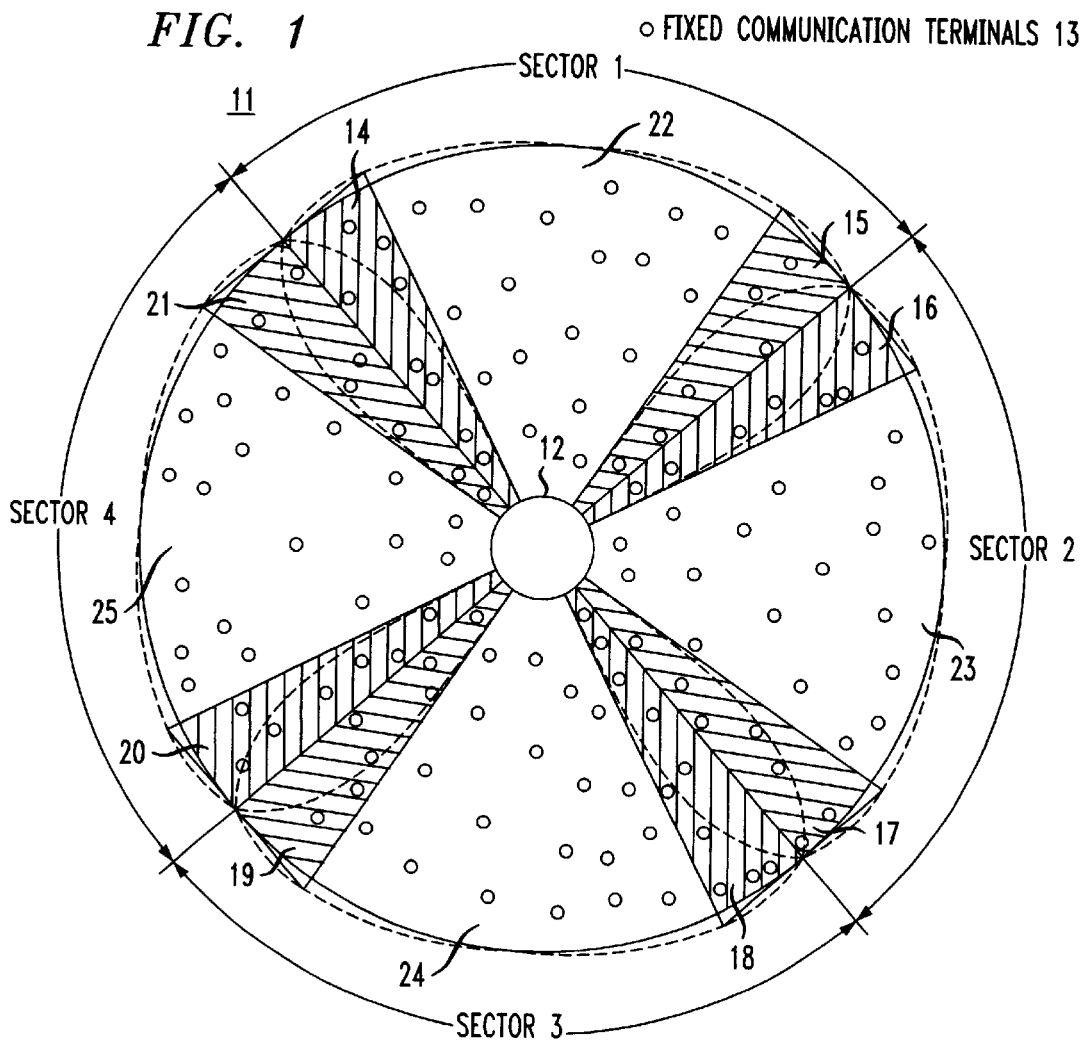
FIG. 1 is a block diagrammatic and schematic showing of a first implementation of the invention in a CDMA system having fixed terminals in which each cell has multiple sectors.

In FIG. 1 a fixed wireless loop cell 11 includes a cell base station 12 and a substantial number of fixed communicating terminals 13. Cells like cell 11 typically are useful in areas that are insufficiently supplied with basic telephone infrastructure, particularly the right-of-ways, lines, cables, substations, and telephone hybrid junctions used in developed urban and suburban areas in the United States. Nevertheless, such a cell can also be used as an overlay providing additional capacity in areas having significant infrastructure. While a single cell is shown, typically a large number of such cells, arranged as needed, would be used.

Cell base station 12 illustratively uses four antennas, each of which can comprise an antenna array, to define four sectors, labeled sector 1, sector 2, sector 3, and sector 4, respectively. Each fixed terminal 13 has its individual antenna or antenna array aimed at cell base station 12 and communicates with other telephone users through the cell base station 12. It may be appreciated that the radiation pattern from cell base station 12 in each of the four sectors necessarily does not fall off precipitously at sector lines, but has some natural roll-off, Each sector, such as sector 1, is divided to include protection sectors, e.g., 14 and 15 to either side of a basic sector 22. In a clockwise direction sector 2 includes protection sectors 16 and 17 and basic sector 23. Sector 3 has protection sectors 18 and 19 and basic sector 24. Sector 4 has protection sectors 20 and 21 and basic sector 25.

For example, protection sectors 14 and 15 and the terminals 13 therein, being supplied from a common antenna, are assigned distinct codes from a first set of codes for protection. Together, these codes may be called set $S_1$. In sector 2, protection sectors 16 and 17 are assigned distinct codes from a second set, called set $S_2$, which does not include any of the codes in set $S_1$. Mutual interference among signals received by terminals 13 in protection sectors 15 and 16 is avoided according to the invention. To avoid mutual interference among signals received by terminals 13 in protection sectors 21 and 14, the code set $S_2$ may be used in protection sectors 20 and 21, since the codes in set $S_1$ are used in protection sector 14. In sector 3, the code set $S_1$ may be reused in protection sectors 18 and 19 because there is no danger of interference with signals in protection sectors 17 and 20. The remaining CDMA codes, not present in sets $S_1$ and $S_2$, comprise a set S and are assigned to terminals 13 in any one of basic sectors 22–25. Set S is illustratively significantly larger than both of sets $S_1$ and $S_2$ together. If we assume 128 total available codes (or more generally, C total available codes), then the codes usable in sector 1 basic sector 22 are numbered as equal to $128-(S_1+S_2)$, and are also usable in the other basic sectors 23–25.

As a simple tutorial example, assume that a total of C CDMA codes are available. Assume further that available codes are allocated to all three sets in proportion to the angles occupied by the respective sectors. If protection sectors 14 and 15 together occupy an angle of B° and the basic sector 22 occupies an angle of A°, then $$A+B=90°. \tag{1}$$

From symmetry, $$S_1=S_2, \tag{2}$$

and the number of codes, S, assigned to each basic sector, $$S=C-2S_1. \tag{3}$$

Thus, $$S_1=(C-S)/2. \tag{4}$$

With the assumed angular distribution of codes, pilot channels being neglected, $$S_1/B=(C-2S_1)/A=S/A. \tag{5}$$

$$S_1=S\times B/A. \tag{6}$$

Substituting, $$(C-S)/2=S\times B/A. \tag{7}$$

Solving, $$S=C/(2B/A+1). \tag{8}$$

EXAMPLE

For C=128, and B=30° (each of protection sectors 14 and 15 being 15°), A=60°. Then, S=128/2=64, $S_1$=32, and $S_2$=32. Then, the total capacity of the cell is proportional to 4×64+2(32+32)=384; whereas the prior a technique would yield 256.

While this analysis is approximate, the general principle is validated. Note that this example represents a limit of a range, in which S is not less than $2S_1$. The assumed angle ratio B/A (=½) is probably larger than is desirable. B/A may certainly be less than ½, that is, the protection sectors may be relatively narrow, so long as potential mutual interference is avoided. S may be correspondingly larger than $2 S_1$.

For another implementation of the invention providing improved reuse of codes, the arrangement of FIG. 1 can readily be applied to an example in which B/A<½. For four sectors, as illustrated, B can be less than 30°. It should also be clear that each protection sector occupies an angle that is ½ of B.

Figure 2:
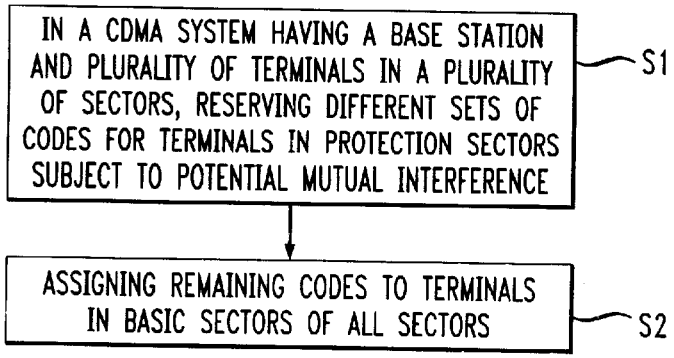
FIG. 2 is a flow diagram of the method of the invention.

FIG. 2 illustrates the method of the invention. Step S1 is as follows. In a CDMA system having at lease one base station 12 communicating in a fixed wireless loop cell 11 with a plurality of fixed terminals 13 in a plurality of sectors, each including two protection sectors that are separated by a basic sector, codes from a first set of codes are divided between the two protection sectors. In adjacent ones of sectors 1–4, a second set of codes for protection is selected to be completely distinct from the first set of codes, i. e., non-overlapping the first set. Once particular codes are assigned to particular terminals, each terminal must be configured to use its assigned code.

Further, the remaining available codes, a majority of the available codes, are used in any one of the basic sectors 22–25. The basic sectors have minimal potential mutual interference.

For any antenna used in this system, an initial step (not shown) of the method should be determining the physical extent of potential mutual interference of the radiation patterns of the separate antennas. That extent is the extent of the radiation pattern roll-off beyond each nominal boundary of the sector served by each antenna. Thus, for any antenna, the proper width of the protection sectors will be determined. This initial step needs to be done only once for any situation where identical antennas will be used. A significantly higher capacity results than in the prior art cases in which the use of the available bandwidth is halved in each sector or in which the use of the available codes is halved in each sector. The advantage results from partitioning the available codes into three groups, for an even number of sectors, two groups for use in the protection sectors to avoid interference and the third group for use in any of the basic sectors, in which no interference is likely.

While the exemplary implementation to be described for FIG. 1 uses four sectors in a cell, in principle the cell could have any number of sectors, two or greater, preferably an even number, so long as a significant basic sector remains in each sector of the cell, It is noted that six sectors per cell are widely used in existing systems, as are also three sectors per cell. When an odd number of sectors is used in a cell, the available codes should be partitioned into four non-overlapping sets, according to the present invention. These code sets comprise three for the protection sectors and one for the basic sectors. The result is somewhat less efficient than the result when using an even number of sectors.

It should be clear that many variations of the implementations of the system and method of the invention of the can be made within the spirit and scope of the invention, that is, within the scope of the following claims and their equivalents.

What is claimed is:

1. A code division multiple access communication system, comprising:
    at least one base station having a plurality of antennas radiating to a plurality of sectors of a fixed wireless loop cell, each sector including two protection sectors and a basic sector between said two protection sectors; and
    in each of said sectors, a respective plurality of fixed terminals configured to send and receive code division multiple access signals to and from said base station, ones of said terminals in protection sectors subject to potential mutual interference being narrower than the basic sector and further configured to send and receive code division multiple access signals using codes selected from different sets of codes, and ones of said terminals in said basic sectors being configured to send and receive code division multiple access signals using codes that are not in any of said different sets of codes;
    each of said two protection sectors being narrower than said basic sector.

2. The code division multiple access communication system according to claim 1, wherein the protection sectors of a sector occupy respective edge regions of the sector, which respective edge regions are subject to potential mutual interference with respect to adjacent sectors, to counteract said potential mutual interference.

3. The code division multiple access communication system according to claim 1, wherein the plurality of antennas comprise an even number of antennas and the cell has an even number of sectors.

4. The code division multiple access communication system according to claim 3, wherein all of the terminals in the protection sectors of the cell are configured to use ones of the respective different sets of codes, which different sets of codes are selected to counteract said potential mutual interference.

5. A method for use in a code division multiple access communication system having at least one base station in a cell communicating with a plurality of fixed terminals in a plurality of sectors of the cell, each of said sectors including two protection sectors and a basic sector between the two protection sectors, each of the two protection sectors being narrower than the basic sector, said method for improving use of codes by the terminals and comprising the steps of:

reserving different sets of codes for assignment to terminals in protection sectors subject to potential mutual interference, and assigning remaining codes not in any of said different sets of codes to terminals in the basic sectors, any of said assigned remaining codes being usable in any of said basic sectors.

6. The method of claim 5, wherein the protection sectors of a sector occupy respective edge regions of the sector, which respective edge regions are subject to potential mutual interference with respect to adjacent sectors, to counteract said potential mutual interference.

7. The method of claim 5, wherein the cell has an even number of sectors, and the reserving step reserves only two different sets of codes for use in protection sectors, a third set of codes being usable in any of said basic sectors not subject to potential mutual interference and reusable in others of said basic sectors.

8. The method according to claim 7, wherein the reserving step reserves the two different sets of codes, the termials in the protection sectors of the cell being configured to use ones of the respective different sets of codes, which different sets of codes are selected to counteract said potential mutual interference.

9. A method for use in a code division multiple access communication system having at least one base station in a cell communicating with a plurality of fixed termials in a plurality of sectors of the cell, each of said sectors including two protection sectors and a basic sector between the two protection sectors, each of the two protection sectors being narrower than the basic sector, said method being for improving use of codes by the terminals and comprising the steps of:

assigning a set of codes to terminals in the basic sectors, any of said assigned codes in said set of codes being usable in any of said basic sectors and reusable in the others of said basic sectors; and reserving sets of codes different from said set of codes for assignment to terminals in protection sectors subject to potential mutual interference to counteract said potential mutual interference.

10. The method of claim 9, wherein the protection sectors of a sector occupy respective edge regions of the sector, which respective edge regions are subject to adjacent sectors, to counteract said potential mutual interference.

11. The method of claim 9, wherein the cell has an even number of sectors, and the reserving step reserves only two different sets of codes for use in the protection sectors.

12. The method according to claim 11, wherein the reserving step reserves the two different sets of codes, the terminals in the protection sectors of the cell being configured to use ones of the respective different sets of codes, which different sets of codes are selected to counteract said potential mutual interference.

\* \* \* \* \*